(12) United States Patent
Danko

(10) Patent No.: US 8,065,037 B2
(45) Date of Patent: Nov. 22, 2011

(54) CONTROL METHOD AND SYSTEM FOR HYDRAULIC MACHINES EMPLOYING A DYNAMIC JOINT MOTION MODEL

(75) Inventor: George Danko, Reno, NV (US)

(73) Assignee: Board of Regents of the Nevada System of Higher Education, on Behalf of the University of Nevada, Reno, Reno, NV (US)

( * ) Notice: Subject to any disclaimer, the term of this patent is extended or adjusted under 35 U.S.C. 154(b) by 750 days.

(21) Appl. No.: 12/188,035

(22) Filed: Aug. 7, 2008

(65) Prior Publication Data

US 2009/0204259 A1    Aug. 13, 2009

Related U.S. Application Data

(60) Provisional application No. 60/954,431, filed on Aug. 7, 2007.

(51) Int. Cl.
     *G05B 19/18*     (2006.01)

(52) U.S. Cl. ............ 700/250; 700/245; 700/258; 701/1; 701/3; 701/16; 701/36; 901/2; 901/15; 901/28; 60/422; 60/468; 60/469; 91/455; 91/448; 91/461; 318/266; 318/467

(58) Field of Classification Search .................. 700/245, 700/250; 701/1, 2, 3, 16, 36, 48, 50; 901/2, 901/15, 28; 60/422, 468, 469; 91/455, 448, 91/461; 318/266, 467; 180/8.5; 254/132; 340/961
See application file for complete search history.

(56) References Cited

U.S. PATENT DOCUMENTS

| | | | | |
|---|---|---|---|---|
| 4,902,945 A * | 2/1990 | Meades et al. | ................. | 318/467 |
| 5,351,601 A * | 10/1994 | Zeuner et al. | .................... | 91/445 |
| 7,194,856 B2 * | 3/2007 | Ma et al. | ......................... | 60/418 |
| 7,441,404 B2 * | 10/2008 | Devier et al. | ................... | 60/368 |
| 7,457,698 B2 * | 11/2008 | Danko | ............................ | 701/50 |
| 2003/0036817 A1 * | 2/2003 | Morley et al. | ................. | 700/245 |
| 2004/0207404 A1 * | 10/2004 | Zhang et al. | .................. | 324/426 |
| 2004/0267401 A1 * | 12/2004 | Harrison | ....................... | 700/182 |
| 2004/0267404 A1 | 12/2004 | Danko | | |
| 2007/0168100 A1 | 7/2007 | Danko | | |
| 2009/0099738 A1 * | 4/2009 | Danko | ............................ | 701/50 |
| 2010/0100256 A1 * | 4/2010 | Jurmain et al. | .................... | 701/2 |

OTHER PUBLICATIONS

Danko, G., Proceedings, The 4th Symposium on Computer Applications in the Mineral Industries, 2001, pp. 253-263, Tampere, Finland.

* cited by examiner

*Primary Examiner* — James Trammell
*Assistant Examiner* — McDieunel Marc
(74) *Attorney, Agent, or Firm* — Ryan A. Heck; UNR-DRI Technology Transfer Office

(57) ABSTRACT

A control method and system for controlling a hydraulically actuated mechanical arm to perform a task, the mechanical arm optionally being a hydraulically actuated excavator arm. The method can include determining a dynamic model of the motion of the hydraulic arm for each hydraulic arm link by relating the input signal vector for each respective link to the output signal vector for the same link. Also the method can include determining an error signal for each link as the weighted sum of the differences between a measured position and a reference position and between the time derivatives of the measured position and the time derivatives of the reference position for each respective link. The weights used in the determination of the error signal can be determined from the constant coefficients of the dynamic model. The error signal can be applied in a closed negative feedback control loop to diminish or eliminate the error signal for each respective link.

19 Claims, 8 Drawing Sheets

CONTROL METHOD AND SYSTEM FOR HYDRAULIC MACHINES EMPLOYING A DYNAMIC JOINT MOTION MODEL

CROSS REFERENCE TO A RELATED APPLICATION

This application claims the benefit of provisional patent application No. 60/954,431, filed on Aug. 7, 2007, the disclosure of which is incorporated by reference herein.

STATEMENT REGARDING FEDERALLY SPONSORED RESEARCH OR DEVELOPMENT

Financial support from the Mining Industry of the Future program of the U.S. Department of Energy, under grant number DE-FC26-04NT42087, is gratefully acknowledged.

The present invention relates to a control method and control system for controlling a hydraulically actuated mechanical arm to perform a task. The mechanical arm can be a hydraulically actuated excavator arm, for example the arm of a mechanical shovel. The method can include an embedded dynamic model of the machine to assist in controlling an end effector supported by the mechanical arm to follow a desired trajectory.

BACKGROUND OF THE INVENTION

Many excavation and loading tasks require equipment operators to simultaneously coordinate the motion of multiple machine links, in order to achieve complex tool trajectories. Efficiency, work quality, and machine wear, can all be affected by the skill and attentiveness of the operator. A software-based kinematics reconfiguration system is described in Danko, G. (2001). Operator control architecture, *Proceedings, The* 4*th Symposium on Computer Applications in the Mineral Industries*, Tampere, Finland, 253-265. ("Danko (2001)" herein) to assist the operator with various tasks. As described in Danko Danko (2001), the operator can select a job-specific, virtual motion kinematics, to be followed by the real machine, under automatic control, and can control the machine in this virtual space.

The implementation of a kinematics transformation with a real machine to follow is a difficult task using sensors and actuators which are usually imperfect. Hydraulic control of heavy machinery adds another difficulty related to the efficiency of the actuators. For energy loss reduction, mobile hydraulics systems generally employ simplified control loops which have higher energy efficiencies than some other control loops, for example such as may be employed for hydraulic robots. However employing simplified control loops can compromise response time and precision.

Manual control of such mobile machines with imperfect hydraulic circuits can work surprisingly well. Compensation for motion errors and response delays can be learned by an operator through training and work experience. Some skilled, experienced operators of heavy hydraulic machinery can perform fine-tuned control tasks with ease and confidence. Accordingly, it would be desirable to provide control methods and systems for such machines that can more efficiently assist the end effector to follow a desired trajectory.

One useful approach is to provide a simple, mathematical model of the machine dynamics and control response during real-time operation and to incorporate the dynamic model in the control loop of the imperfect machine.

System identification in hydraulic machine control systems is addressed in U.S. Patent Application Publication No. 2007/0168100 to Danko ("Danko '100" herein) the entire disclosure of which is incorporated by reference herein.

Some of the difficulties that may arise in providing suitable control methods and systems include the difficulty of adapting to time-dependent variations of the machine itself. A control system's range of adaptation is usually limited, and the control system's adaptation ability may be overwhelmed in case of large changes in factors such as the external load on the machine, unknown disturbances due to the mass and inertia of the load-bearing links and so on. Orders of magnitude variation in external load disturbances are not unusual during some excavation and loading operations in the construction and mining industries.

For these and other reasons, known control methods and systems can attempt to provide great flexibility in the adaptability of the control system parameters to allow for unknown, possibly unlimited and arbitrary ranges of variation in such factors.

Industrial robots can be sometimes controlled based on a pre-planned trajectory which can be described in terms of the position and orientation of the end-effector (by means of start and end points, as well as intermediate via points). The velocity of the end-effector may also be specified at various points along the path. Trajectory planning involves calculation of a continuous desired path (described in terms of position, velocity and acceleration) which satisfies the specified constraints. Joint torques can be calculated based on the desired acceleration using the inverse kinematics of the manipulator.

Differential control architecture such as that described and claimed in U.S. Patent Application Publication No. 2004/0267404 to Danko ("Danko '404" herein), the disclosure of which is incorporated by reference herein, allows an operator to perform the trajectory planning in real-time by recognizing that a manual machine is often velocity controlled. Position is controlled implicitly by integration of the machine velocity.

Danko '404 describes and claims a differential control architecture wherein as-built motion kinematics of the machine can be transformed into an as-desired, virtual motion kinematics. The operator can control a virtual, as-desired machine, while the real, as-built machine follows the movement of the virtual machine. In some embodiments of the described invention, the motion trajectory of the tool of the machine is not explicitly determined nor is employed for control of the machine. Position information (from measurement) can, if desired be employed, for the transformation of the machine kinematics from as-built to a virtual, as-desired machine. A kinematics transformation performed as described in Danko '404 can be useful but approximate owing to measured but imprecise tool position information in the calculation.

Danko '100 describes control architecture wherein tool position information from measurement is not required in the machine kinematics transformation. Instead, the calculated tool position of the virtual machine can be used for the kinematics transformation. This is because the tool motion and the kinematics of the real machine may not accurately follow the desired tool motion of the virtual machine. Embodiments of Danko '100 can compare a virtual, potentially errorless, desired reference tool position with the measured tool position. The velocity control signals to the actuators can then be modified by closed-loop feedback control, or other suitable means, in such a way that the difference between the measured real tool position and the reference tool position is reduced or minimized or eliminated. However, in some cases, the reference position derived from a kinematics model may not be achievable with a real machine having dynamic limitations.

Accordingly, it would be desirable to provide a control method and system for controlling a hydraulic machine which can adapt to the dynamic limitations of a real machine.

The foregoing description of background art may include insights, discoveries, understandings or disclosures, or associations together of disclosures, that were not known to the relevant art prior to the present invention but which were provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

SUMMARY OF THE INVENTION

The present invention provides, in one aspect, a control method for controlling a hydraulically actuated mechanical arm to perform a task. The mechanical arm can be a hydraulically actuated excavator arm and can comprising a support, multiple links, an end effector, multiple joints and multiple controllable actuators. The end effector can be a work implement supported by the links for movement relative to the support. The multiple joints can connect the multiple links one to another, to the support and to the end effector. Each joint can be movable to different joint positions to effect relative movement of the members connected by the respective joint and the multiple controllable actuators can effect the joint movements.

The method can employ a control system comprising a number of selectable virtual machine kinematics configurations providing end effector trajectory families for performing different tasks. The control system can also comprise an operator interface comprising operator input devices, optionally joysticks. The operator interface can enable an operator to select a desired virtual machine kinematics transformation for the movement of the end effector and to define a desired trajectory within the virtual kinematics of the end effector movement.

The method can comprise the operator selecting a suitable kinematics transformation to perform a desired task and the operator providing control signals relative to the transformed virtual machine in real time employing the operator interface input devices to define a desired trajectory.

The control system can control the actuators to move the end effector along the desired trajectory by generating a control signal for each joint actuator. Each control signal can comprise an input signal vector providing, at discrete time steps, a reference position for each link according to the virtual differential kinematics configuration for the desired trajectory. The input signal vector can also provide the time derivatives of the reference position up to at least the second derivative of the reference position.

The method can also comprise measuring the actual positions of each link for the respective time steps and providing an output signal vector from the measured actual positions. The output signal vector can comprise, for each time step, a measured position for each link and the time derivatives of the measured position up to at least the second derivative of the measured position.

The method can further comprise determining a dynamic model of the motion of the hydraulic arm for each link by relating the input signal vector for each respective link to the output signal vector for the same link, wherein the dynamic model comprises constant coefficients.

In addition, the method can comprise determining an error signal for each link as the weighted sum of the differences between the measured position and the reference position and between the time derivatives of the measured position and the time derivatives of the reference position for each respective link wherein the weights used in the determination of the error signal are being determined from the constant coefficients of the dynamic model, and can also comprise applying the error signal in a closed negative feedback control loop to diminish or eliminate the error signal for each respective link.

In another aspect the invention comprises a control system which can be employed for performing the above-described control method or other suitable control methods. In addition to the above described elements, the control system can comprise a joint control and machine actuators system configured to generate a control signal for each joint actuator, each control signal comprising an input signal vector providing, at discrete time steps, a reference position for each link according to the virtual differential kinematics configuration for the desired trajectory, the input signal vector also providing the time derivatives of the reference position up to at least the second derivative of the reference position.

The control system can also comprise a dynamic joint model module configured to determine a motion model of the hydraulic arm for each link by relating the input signal vector for each respective link to the output signal vector for the same link.

The control system can further comprise a position and velocity error corrector configured to determine an error signal for each link as the weighted sum of the differences between the measured position and the reference position and between the time derivatives of the measured position and the time derivatives of the reference position for each respective link.

Desirably, the control system can be configured to apply the error signal in a closed negative feedback control loop to diminish or eliminate the error signal for each respective link.

BRIEF DESCRIPTION OF THE SEVERAL VIEWS OF THE DRAWING

Some embodiments of the invention, and of making and using the invention, as well as the best mode contemplated of carrying out the invention, are described in detail herein and, by way of example, with reference to the accompanying drawings, in which like reference characters designate like elements throughout the several views, and in which.

DETAILED DESCRIPTION OF THE INVENTION

Figure 1:
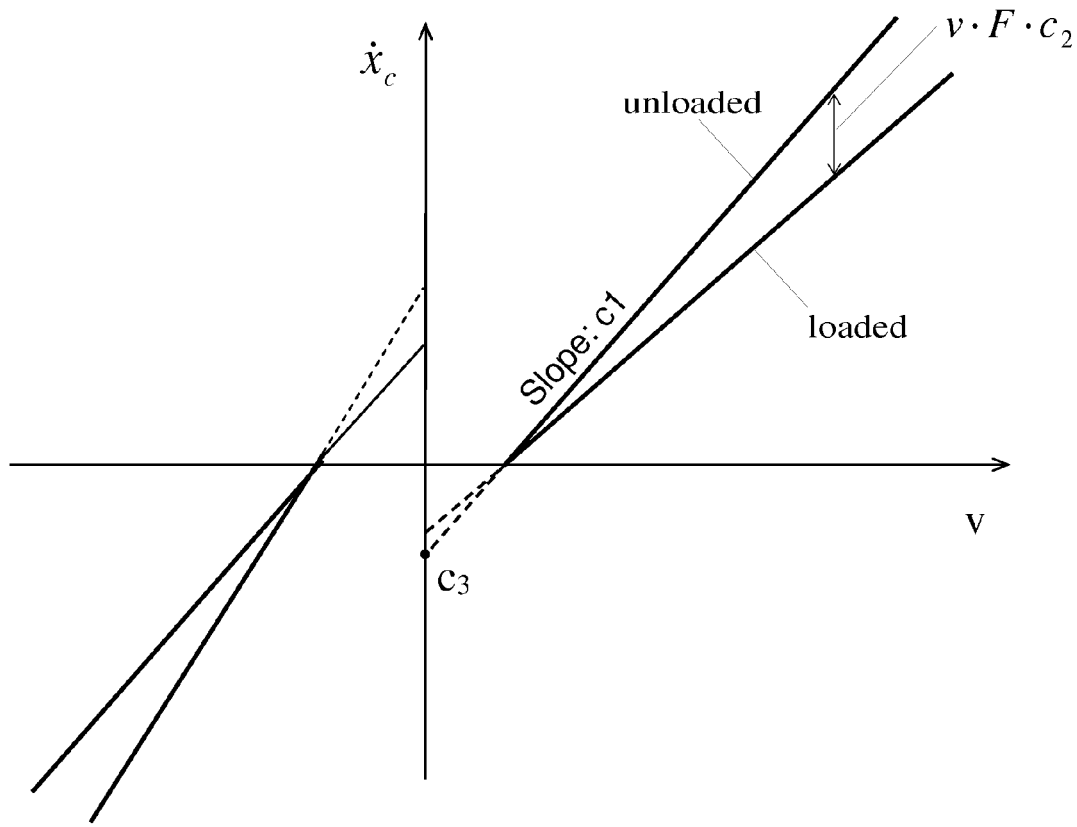
FIG. 1 is a schematic view showing hydraulic actuator velocity of an exemplary hydraulic machine with which embodiments of control method and control system according to the invention can be employed, as a function of a control voltage; wherein three constants, $c_1$, $c_2$ and $c_3$ are shown only in the first quadrant.

Some embodiments of the hydraulic machine control systems described in Danko '100 employ closed-loop feedback control to reduce the difference between the real position of the tool or end effector, obtained from measurement, and the desired position obtained from a virtual machine kinematics model of the tool. However, as stated, in some cases, the reference position derived from a kinematics model may not be achievable with a real machine having dynamic limitations. This is because the model may be idealized and may ignore or approximate mass, or other parameters. Considerations such as the limited forces, bounded by the hydraulic pressure available in to a real machine and the consequent limits to acceleration of the machine links and other components may also be ignored or approximated.

For these or other reasons, known adaptive control theory, and other theoretical considerations, such as have been developed for robotics or the like does not suggest use of a reference position in this manner. In contrast, the present invention can employ a reference position and its derivatives with time, at least up to the second derivative, as reference values at any given time instant for the evaluation of the motion error.

Thus, the present invention provides, in one aspect, a model-identification-based adaptive control method which can be described as an adaptive self-tuning regulator ("STR" herein) method. In one embodiment, a model identification step employing a novel least squares estimation is used. In another embodiment, a computationally-efficient recursive least-squares algorithm is used.

Danko '100 also describes an inventive method wherein a kinematics-based reference position is employed as a target in an adaptive control system. Also disclosed in Danko '100 is an embodiment of real-time adaptive controller design that can provide a stable closed-loop feedback control signal capable of diminishing the difference between measured and reference tool positions during motion. In some embodiments of the Danko '100 invention, control can be established by employing a sliding time-window-based, time-dependent, least-square-fit-based, dynamic motion models for relevant machine links. The model or models can be determined real-time during operation and updated frequently at suitable time intervals, for example every 2.5 ms. Individual model for each link of the machine can be fitted to measurement input and output data. Such methods can provide an efficient system model requiring only computational resources for the control system during real runtime.

Some examples of systems and methods for controlling the motion of the end effector of a mechanical arm with hydraulic actuators such as a hydraulic excavator according to the invention will now be described. An operator selects a virtual kinematics configuration best suited for the task whereas maintains real-time, full control of the motion of the end effector including a desired path and speed within the motion coordinate system for the selected virtual kinematics configuration. A reference position and its time derivatives can be determined for each actuator of the mechanical arm by the control system at each discreet sampled time instant. As a positive input to a summator, a reference control velocity is sent to the actuators motion control unit of each link to generate the desired motion. A dynamic motion model is determined by the control system by relating the effective input signal to the actuator's motion control unit of each link and the output signal vector of the motion of the same link. The output signal vector comprises the measured position and its time derivatives up to at least the second derivative (for example acceleration). The dynamic motion model's determination involves the identification of constant coefficients by relating the sampled values of the input signal and output signal vector over a sliding time window over a sufficiently long time, for example, 500 ms, sampled at a number of discrete time steps, for example, 200. An error signal for each link is determined as the weighted sum of the differences between the measured position and its time derivatives and the reference position and its time derivatives, whereas the weights can be determined based on the coefficients of the dynamic motion model obtained for the previous sliding time window. The error signal is continuously subtracted from the said positive input to the said summator of the actuator's motion control unit of each link to minimize or eliminate motion error.

If desired, method embodiments of the invention can comprise determining a dynamic model of each link by identifying constant coefficients of a differential equation of at least second order relating the sampled signal values of the position and the position time-derivatives to the sampled signal values of the control input signal by comparing the sampled values of the input signal vector with the sampled values of the output signal vector over a sliding time window comprising a number of the discrete time steps. The identifying of the constant coefficients of the differential equation can comprise a least-square fit for achieving a best comparison for a selected number of samples.

Control methods according to the invention can also comprise determining the weights in the weighted sum from the coefficients of the dynamic motion model obtained for a previous sliding time window, optionally the immediately preceding sliding time window. The weights can be calculated from the coefficients using a multiplier of less than unity.

The sliding time window can have any suitable duration for example a duration in the range of from about 0.1 second to about 1 second, optionally about 500 milliseconds and the sliding time window can comprise from about 50 to about 500 of the discrete time steps, optionally about 200 or another suitable number of discrete time steps.

If desired, the control system can comprise a motion control unit for each actuator, and the method can comprise supplying each input signal vector as a positive input to a summator for the motion control unit of the respective actuator for each link to generate the desired motion. Also, the control method can comprise continuously subtracting the error signal from the positive input to each link summator to diminish the determined motion error.

Usefully, each link position can be described with reference to a linear displacement, optionally, linear displacement of an actuator component.

The invention includes a method of operating an excavator comprising a hydraulically actuated mechanical arm wherein the operating method comprises controlling the hydraulically actuated mechanical arm by a control method according to the invention. The invention also includes an excavator or other suitable hydraulic machine provided with a control system according to the invention and/or controlled by a control system according to the invention.

A simple procedure for extracting a causal model from noisy, measured system responses, and useful in embodiments of control method according to the invention, will now be described. For use in real time, computational efficiency and stability in model identification can be helpful. Also described herein is, an adaptive controller which directly uses of the identified system parameters.

Causal System Model

For an n-link machine, the joint positions $x_1, x_2, \ldots, x_n$ can be denoted by the n-vector $x=[x_1, x_2, \ldots, x_n]$. Position may be considered linear (in Cartesian) or angular (in revolute) coordinate system. Although fifth or even higher-order models sometimes can be expected in hydraulic system applications, a pursuant to the present invention, a useful model solution can be provided with low-order, but time-variant model application. A simplified motion equation can be written as a second-order vector differential equation between positions x, velocities $\dot{x}$, and accelerations $\ddot{x}$:

$$M(x)\ddot{x}+K(x)\dot{x}+Q(\dot{x},x)=S(x_c-x) \quad (1)$$

In Eq. (1), M(x) is an n×n matrix that represents the moment of inertia and mass reduced to the joint axes. K(x) and $Q(\dot{x}, x)$ are n×n matrices of velocity-proportional resistance coefficient and position-proportional load force or torque components, respectively. S(x) can be a diagonal n-vector, representing the spring constants of the actuators expressed as torque or force vectors. The active force or torque term can be a function of $x_c$, the no-load, control compliance position vector which in turn can be a function of a link control signal, such as is described herein.

Since all $x_i (i=1 \ldots n)$ can be mapped during motion as functions of time t, the non-linear Eq. (1) can be conveniently converted into a time-variant motion equation by eliminating x from the coefficient matrices, and replacing it with t:

$$M(t)\ddot{x}+K(t)\dot{x}+Q(t)=S(t)\cdot(x_c-x) \quad (2)$$

Eq. (2) can be re-arranged, by collecting all position-dependent cross-effects into T, a modified, time-dependent force or torque function. For the $x_i (i=1 \ldots n)$ component, it reads:

$$M_{i,i}\ddot{x}_i+K_{i,i}\dot{x}_i+T_i(t)=S(x_i-x_i), \quad (3)$$

where $T_i(t)$ is:

$$T_i(t) = \sum_{\substack{j=1 \\ j \neq i}}^{n} [M_{i,j}\ddot{x}_j + K_{i,j}\dot{x}_j] + Q(t) \quad (4)$$

The set of n simultaneous differential equations in Eq. (3) can define a simplified dynamic model of an n-link machine. Coupling between the links can be represented by the modified force or torque function $T_i(t)$; with time dependence, the coupling can be, "frozen" in time, and the model for each link can be considered independently, provided that T can be considered to be unknown, subject to identification. Eq. (3) with simplified notation (by eliminating the reference to i) for one link reads:

$$M\ddot{x}+K\dot{x}+T=S(x_c-x) \quad (5)$$

The time derivative of the $x_c$ compliance position vector can be assumed to be equal to the hydraulic actuator velocity which can be a function of the control voltage, v:

$$\dot{x}_c = c_1 \cdot v - c_2 \cdot v \cdot F + c_3 \quad (6)$$

Eq. (6) can be shown in graphical form in FIG. 1. As depicted, the compliance velocity itself can be assumed to be load dependent. Substituting the actuator load, F, with $F=S(x_c-x)$, Eq. (6) gives a coupling differential equation between $x_c$ and x:

$$\dot{x}_c = c_1 \cdot v - c_2 \cdot v \cdot S \cdot (x_c-x) + c_3 \quad (7)$$

Substituting $x_c$ and its time derivative $\dot{x}_c$ from Eq. (5) into Eq. (7) gives a third order differential equation for the velocity-controlled motion as follows:

$$A_t(t)\cdot \dddot{x}(t)+B_t(t)\cdot \ddot{x}(t)+C_t(t)\cdot \dot{x}(t)+D_t(t)=v(t) \quad (8)$$

where $$\left.\begin{aligned} A_t &= \frac{M(t)}{S(t)\cdot c_1} \\ B_t &= \frac{K(t)}{S(t)\cdot c_1} + \frac{M(t)\cdot c_2}{c_1}\cdot v(t) \\ C_t &= \frac{1}{c_1} + \frac{c_2}{c_1}\cdot K(t)\cdot v(t) \\ D_t &= \frac{\dot{T}(t)}{S(t)\cdot c_1} - \frac{c_3}{c_1} + \frac{c_2}{c_1}\cdot T(t)\cdot v(t) \end{aligned}\right\} \quad (9)$$

The fact that x has cancelled out of Eq. (8) agrees with the model concept that the system does not have a position "memory".

A $4^{th}$-order model can be achieved by following the $\dot{x}_c$ compliance velocity signal further along the hydraulic pressure line and allow for a concentrated pressure loss. This would add a $4^{th}$ derivative with its system coefficient to the left-hand side of Eq. (8). Spatially-distributed system elements may increase the order of the model further. However, for simplicity, only the $3^{rd}$ order system is described.

As shown, the coefficients $B_t$, $C_t$ and $D_t$ in Eq. (8) can be control signal dependent even in this most simple machine model. This nonlinearity is not addressed in known treatments for linear, constant-coefficients, a priori models. Unless the coefficients can be credibly stabilized, nonlinearity can be dealt with. Fortunately, there can be a constant and a variable part in $B_t$, $C_t$, and $D_t$. This fact, after integration, allows for treating $B_t$, $C_t$, and $D_t$ to be sliding-window-averaged constants, since they can be "less stringently" time-dependent than the x variable itself.

Eq. (8) thus can be integrated over a sliding time period in order to constitute the sliding-window averaging. This will allow for using $B_t$, $C_t$, and $D_t$ as constant, integral mean values over the same time period. After integration with time, and factoring out constants, Eq. (8) becomes an integral-differential equation:

$$A \cdot [(\ddot{x}) - \ddot{x}(t_0)] + B \cdot [(\dot{x}) - \dot{x}(t_0)] + \qquad (10)$$
$$C \cdot [x - x(t_0)] + D \cdot (t - t_0) = \int_{t_0}^{t} v \cdot d\tau$$

The A, B, C, and D constants, now represent integral mean values in Eq. (10). Although linearized, this new equation cannot be represented by a transfer function in the Laplace domain, leading to a time-domain analysis.

The problem at hand can be defined as follows: find the time variant coefficients A, B, C and D in the dynamic model of each link by best matching the predicted x angular positions from the model with observed (measured) $x^M$ values over a sufficiently long $\Delta T$ time period, for a given v as known control input. A least-square-fit matching can be used with a new solution approach by matching for all terms in the integral-differential equation simultaneously.

Eq. (10) can be used for N number of $x_i = x(t_i)$ observations with time (i=1 . . . N), as sampled values of the continuous position functions, x. Coefficients A, B, C, and D can be assumed to be integral mean value constant for all $[t_0, t_i]$ time intervals simultaneously. The N equations can be written in a simplified matrix form as follows:

$$[\ddot{X} \quad \dot{X} \quad X \quad T] \cdot \begin{bmatrix} A \\ B \\ C \\ D \end{bmatrix} = V \qquad (11)$$

where the definition of matrix $[\ddot{x} \ \dot{x} \ x \ T]$ with column vectors $\ddot{x}, \dot{x}, x$ and T can be as follows:

$$[\ddot{X} \quad \dot{X} \quad X \quad T] = \begin{bmatrix} \ddot{x}_1 - \ddot{x}(t_0) & \dot{x}_1 - \dot{x}(t_0) & x_1 - x(t_0) & t_1 - t_0 \\ \vdots & \vdots & \vdots & \vdots \\ \ddot{x}_i - \ddot{x}(t_0) & \dot{x}_i - \dot{x}(t_0) & x_i - x(t_0) & t_i - t_0 \\ \vdots & \vdots & \vdots & \vdots \\ \ddot{x}_N - \ddot{x}(t_0) & \dot{x}_N - \dot{x}(t_0) & x_N - x(t_0) & t_N - t_0 \end{bmatrix} \qquad (12)$$

Vector V in Eq. (11) can be the control voltage integral:

$$V = \begin{bmatrix} \int_{t_0}^{t_1} v \, dt \\ \vdots \\ \int_{t_0}^{t_i} v \, dt \\ \vdots \\ \int_{t_0}^{t_N} v \, dt \end{bmatrix} \qquad (13)$$

A new element of the solution can be matching simultaneously $x_i$, $\dot{x}_i$ and $\ddot{x}_i$ with those determined from measurement, $x_i^M$, $\dot{x}_i^M$ and $\ddot{x}_i^M$. Although this can be not equivalent to matching only $x_i$ with $x_i^M$, the simultaneous matching with the derivatives according to Eq. (10) has enormous computational advantage in finding the A, B, C and D constants. This can be accomplished using simple linear algebra:

$$\begin{bmatrix} A \\ B \\ C \\ D \end{bmatrix} = Pinv[\ddot{X}^M \quad \dot{X}^M \quad X^M \quad T] \cdot V, \qquad (14)$$

where $$[\ddot{X}^M \quad \dot{X}^M \quad X^M \quad T] = \begin{bmatrix} \ddot{x}_1^M - \ddot{x}^M(t_0) & \dot{x}_1^M - \dot{x}^M(t_0) & x_1^M - x^M(t_0) & t_1 - t_0 \\ \vdots & \vdots & \vdots & \vdots \\ \ddot{x}_i^M - \ddot{x}^M(t_0) & \dot{x}_i^M - \dot{x}^M(t_0) & x_i^M - x^M(t_0) & t_i - t_0 \\ \vdots & \vdots & \vdots & \vdots \\ \ddot{x}_N^M - \ddot{x}^M(t_0) & \dot{x}_N^M - \dot{x}^M(t_0) & x_N^M - x^M(t_0) & t_N - t_0 \end{bmatrix} \qquad (15)$$

In Eq. (14), Pinv can be the pseudo-inverse of the matrix containing measured position signal properties. Pinv can be a solution to an over-determined set of equations when N>4, constituting a least-square-fit solution.

With A, B, C and D identified for a link, Eq. (11) defines the inverse of the machine link model, $M^{-1}$: (X→V), since it can be explicit in v. The machine link model for x from the M: (V→X) prediction model can be found by solving Eq. (10).

The solution of Eq. (10), however may not reproduce x well enough for practical purposes even within the $\Delta t = [t_o, t_N]$ time interval, due to noise disturbance to model identification. The reason behind the potential mis-match between $x(t_i)$ and $x_i^M$ can be that the least-square-fit technique used involves matching the sum of x, $\dot{x}$, and $\ddot{x}$ with the corresponding properties of the measured data, as opposed to just matching X to the measured $X^M$ data. The model may be erroneous or un-stable even if the machine can be well controllable and has no stability problems. The stability of the solution to Eq. (8) with constant A, B, C, and D can be examined using the characteristic (or auxiliary) polynomial equation and examining its roots:

$$Am^2 + Bm + C = 0 \qquad (16)$$

If the real part of both roots can be negative, a stable solution can be expected. Otherwise, the solution may be unstable, having exponential increases with time. Furthermore, even if the solution can be stable, the prediction may not be acceptable. Reversely, even if the solution can be unstable, during the short $\Delta T = t_N - t_0$ time period, the solution may be bounded and useful. Therefore, the quality of the model can only be judged by examining the solution itself. For this purpose, and for comparison with an improved model, a simplified, numerical solution to Eq. (10) can be given.

The first and second derivatives of x can be calculated using a sliding polynomial approximation of the continuous x(t) function. For any given three points taken at $t_i$, $t_{i+1}$, $t_{i+2}$ time, a quadratic polynomial can be determined and used as a continuous interpolation function for finding the time derivatives. Assuming equidistant time division with $\Delta t$ time intervals, the first and second derivatives can be as follows from the polynomial approximation:

$$\dot{x}(t_i) = \frac{3x_i}{2\Delta t} - \frac{2x_{i-1}}{\Delta t} + \frac{x_{i-2}}{2\Delta t} \qquad (17)$$

$$\ddot{x}(t_i) = \frac{x_i}{\Delta t^2} - \frac{2x_{i-1}}{\Delta t^2} + \frac{x_{i-2}}{\Delta t^2} \qquad (18)$$

Eqs. (17) and (18) represent linear, third-order filters with constant filter coefficients. For this reason, Eqs. (17) and (18) will be referred to as derivative filters. These derivative filters also represent the link between the continuous-time, differential model and the discrete-time sampling of the position.

Substituting Eqs. (17) and (18) into (10) for all i=1 ... N and arranging them into a matrix-vector equation gives the following form:

$$Q \cdot [X + x(t_0)] + DT - A\ddot{x}(t_0) - B\dot{x}(t_0) - Cx(t_0) = V, \qquad (19)$$

where Q can be a tri-diagonal matrix:

$$Q = \begin{bmatrix} m_1 & 0 & 0 & & \\ m_2 & m_1 & 0 & & \\ m_3 & m_2 & m_1 & & \\ & & & \ddots & \\ & & m_3 & m_2 & m_1 \end{bmatrix} \qquad (20)$$

and $$\left. \begin{aligned} m_1 &= \frac{A}{\Delta t^2} + \frac{3B}{2\Delta t} + C \\ m_2 &= -\frac{2A}{\Delta t^2} - \frac{2B}{\Delta t} \\ m_3 &= \frac{A}{\Delta t^2} + \frac{B}{2\Delta t} \end{aligned} \right\} \qquad (21)$$

The prediction model for relative position M: (V→X) can be expressed from Eq. (19) using matrix inverse:

$$X^P = \text{inv}(Q)[V - DT + A\ddot{x}(t_0) + B\dot{x}(t_0) + Cx(t_0)] - x(t_0) \qquad (22)$$

Eq. (22) gives a causal relationship between input V and output $X^P$. The initial conditions in position, velocity, and acceleration can be explicitly included in the solution. Due to the structure of Q, the inverse matrix, inv(Q) can be always a lower-triangular matrix satisfying the expectation that values of the input at future time cannot affect past and present output values. However, the matrix inverse in Eq. (22) may not exist or may be badly conditioned, hampering the practical use of the model in its inverted form.

An Un-Relativistic, Causal System Model

In order to reduce the numerical defect of the conventional causal model, a special prediction algorithm can be applied, resulting in an unrelativistic (UnR) model form. The prediction model can be formulated using the matching scheme once again from Eq. (11). Accordingly, X can be expressed while expecting to satisfy the equation with the $\ddot{X}_i^M$ and $\dot{X}_i^M$ derivatives. Assuming that C≠0, the re-arranged equation as applied for predicting $X^P$ reads:

$$X^P + \frac{1}{C} \cdot [\ddot{X}^M \ \dot{X}^M \ 0 \ T] \cdot \begin{bmatrix} A \\ B \\ C \\ D \end{bmatrix} = \frac{1}{C} \cdot V, \qquad (23)$$

where 0 can be the zero vector.

From Eq. (23), the predicted position vector, relative to the initial position, can be expressed in a compact form:

$$X^P = M \cdot V, \qquad (24)$$

where the coefficient matrix M, the transfer function of the system in the time domain, can be given as:

$$M = \frac{1}{C}\{I - [\ddot{X}^M \ \dot{X}^M \ 0 \ T] Pinv([\ddot{X}^M \ \dot{X}^M \ X^M \ T])\} \qquad (25)$$

Figure 2:
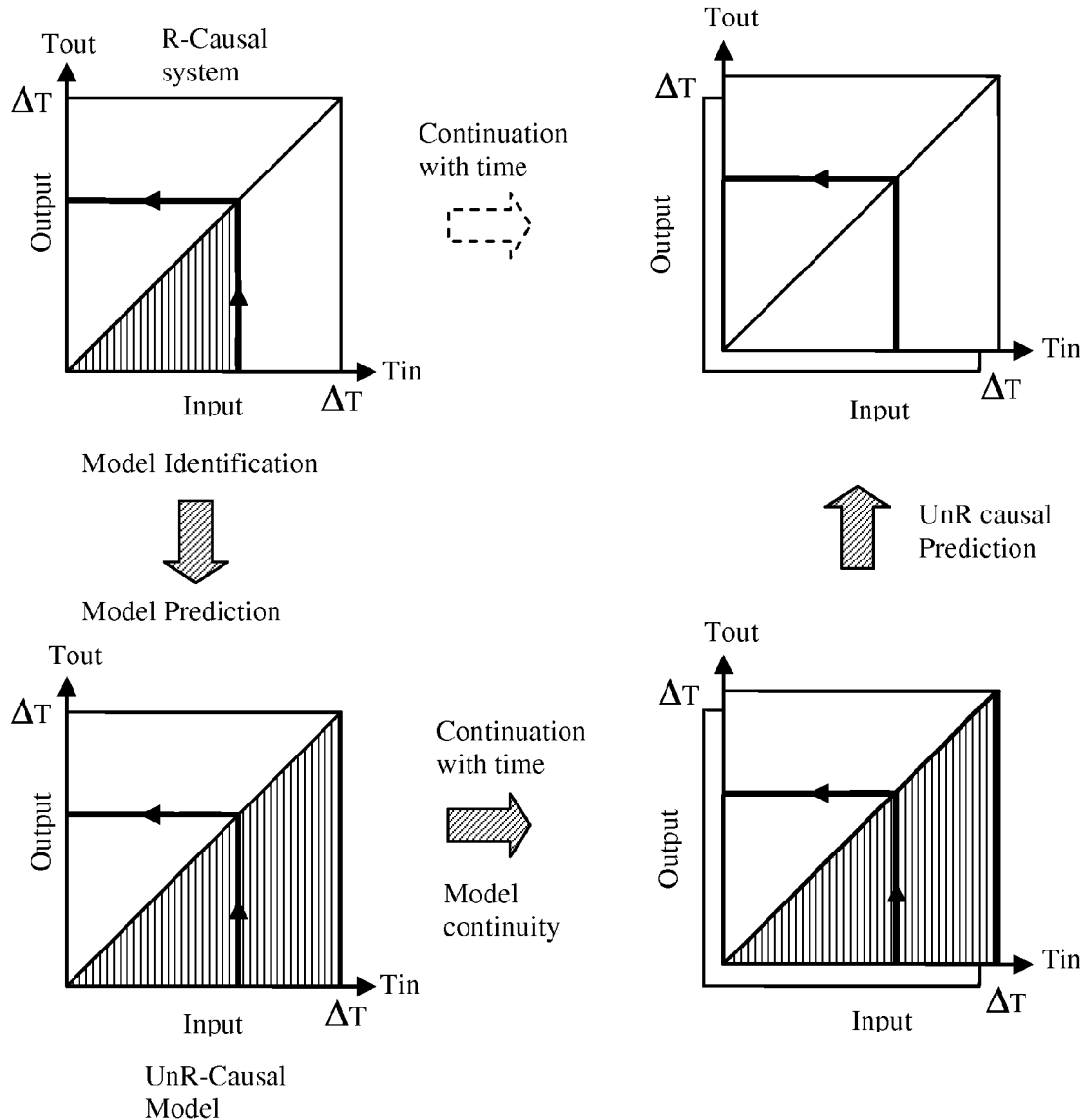
FIG. 2 is a conceptual flow chart of an embodiment of control system according to the invention showing model prediction with an unrelativistic ("UnR" herein) causal model.

In Eq. (25), I can be the $N^{th}$ order identity matrix and M can be an N×N matrix that represents the operator of the system. From physical considerations of any relativistic-causal (R-Causal) system, M should be a lower-triangular matrix, so that a control value at a future time instant does not affect current and past output values. In numerical, real world applications, this expectation may not be satisfied. There can be no algebraic support which could make M a lower-triangular matrix calculated from Eq. (25). The model thus can be considered unrelativistic regarding time and space relations, rendering past and present to be functions of future. However, a UnR model may still be considered causal within a captured time domain. FIG. 2 depicts the input-output relations regarding the time domain during which the input values affect the output values. As shown, the Unrelatavistic causal model uses all the input over the full ΔT time domain for predicting the output at any time instant. At the end of the ΔT time interval, the model can be causal, considering that the measured parameters can be already captured and frozen. The same prediction technique may be used to reconstruct the $\dot{x}$ and $\ddot{x}$ vectors from prediction models. Assuming that neither A nor B can be zero, the prediction models read:

$$\dot{X}^P = M_v \cdot V \quad (26)$$
$$= \frac{1}{B}\{I - [\ddot{X}^M \quad 0 \quad X^M \quad T]Pinv([\ddot{X}^M \quad \dot{X}^M \quad X^M \quad T])\}V$$

$$\ddot{X}^P = M_a \cdot V \quad (27)$$
$$= \frac{1}{A}\{I - [0 \quad \dot{X}^M \quad X^M \quad T]Pinv([\ddot{X}^M \quad \dot{X}^M \quad X^M \quad T])\}V$$

The $M_v$ and $M_a$ coefficient matrices in Eqs. (26) and (27) can be also represent Unrelatavistic causal prediction models.

It can be possible to improve the performance of the position prediction model given in Eq. (23) by removing $\ddot{x}^M$ and $\dot{x}^M$ and replacing them with the predicted values $\ddot{x}^P$ and $\dot{x}^P$ according to Eqs. (26) and (27). The model matrix M in this case is:

$$M = \frac{1}{C}\left\{\begin{array}{c} I - [Ma \cdot V \quad Mv \cdot V \quad 0 \quad T]Pinv \\ ([\ddot{x}^M \quad \dot{x}^M \quad X^M \quad T]) \end{array}\right\} \quad (28)$$

Figure 3:
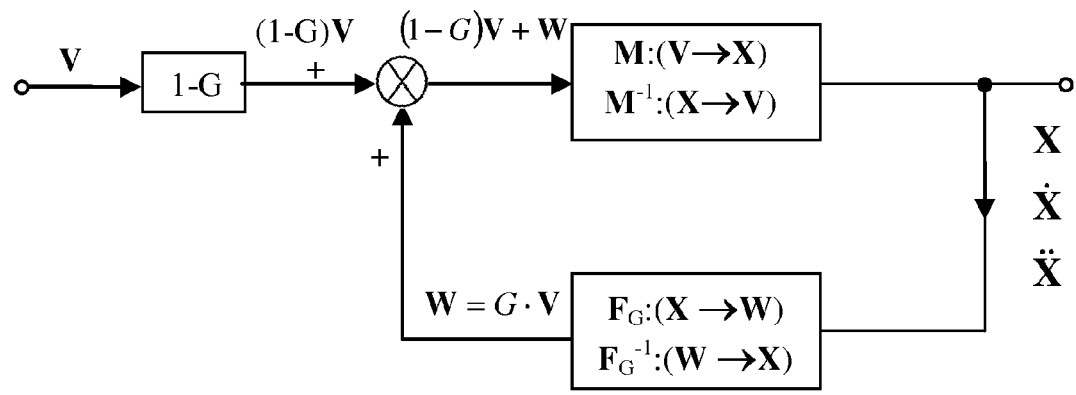
FIG. 3 is a schematic view of a M:(X→V) system with a positive identity feedback control model $F_G$:(X→W)

Since the measured values can be removed, the model in Eq. (28) may have wider useful prediction regime around the measured position than that of Eq. (25). An iteration procedure may be devised using the new M, then calculating and feedbacking a new $X^P$ into the $\dot{X}^P$ and $\ddot{X}^P$ predictions and continue until all assume stationary values. This iteration procedure may or may not converge, and not pursued in the current application. can be The Identity Feedback Controller The feedback control task can be defined in the integral time domain using the first time-integral of the input and output signals. After solving for the integral of the control signal, a time-averaged derivation over the observation time interval can be used to return to the time domain. It can be possible to define a positive identity feedback model, $F_G$: (X→W) that does not affect system output when connected in a closed feedback loop with the M:(V→X) system model, shown in FIG. 3. An internal feedback gain, G can be defined as the scalar multiplier of the input signal V to equate the time-integrated feedback signal, W=G·V. It can be sufficient to use the $M^{-1}$:(X→V) inverse model for the analysis, in the form of Eq. (11).

The input-output relationship for the system with the feedback may be written as follows:

$$[\ddot{X} \quad \dot{X} \quad X \quad T] \cdot \begin{bmatrix} A \\ B \\ C \\ D \end{bmatrix} = (1 - G)V + W \quad (29)$$

Note that the input signal V can be multiplied by a factor of 1-G to cancel the effect of adding G·V to the input of the M model.

The feedback model can be $F_G$:(X→W), assigning W as output to X as input, while its inverse can be $F_G^{-1}$:(W→X). Note that with X, there come the derivatives, $\dot{x}$, and $\ddot{x}$ as well. The inverse feedback model $F_G^{-1}$:(W→X) can be assumed in the form of a constant-coefficient integral differential equation analogous to that of Eq. (10) but now with a, b, c and d constants and input function W. The $F_G$:(X→W) model thus satisfies the following matrix equation:

$$[\ddot{X} \quad \dot{X} \quad X \quad T] \cdot \begin{bmatrix} a \\ b \\ c \\ d \end{bmatrix} = W \quad (30)$$

Substituting Eq. (30) into Eq. (29), applying Eq. (14) to the X output and its derivatives, and re-arranging for the [a, b, c, d]$^T$ vector, the following equation can be obtained:

$$\begin{bmatrix} a \\ b \\ c \\ d \end{bmatrix} = G \begin{bmatrix} A \\ B \\ C \\ D \end{bmatrix} \quad (31)$$

Note that only the $M^{-1}$:(X→V) inverse model can be needed for $F_G$:(X→W), and it can be not necessary to use the $M^{-1}$:(V→X) for the feedback model. The simple least-square-fit identification for $M^{-1}$:(X→V) from Eq. (14) can be sufficient for the task without actually turning to a UnR model. Similarly, $F_G^{-1}$:(W→X) can be not needed for the task; should it be useful, a UnR model for $F_G$:(X→W) would be needed. The identity feedback controller will produce W with which the V–W input signal results in X.

Figure 4:
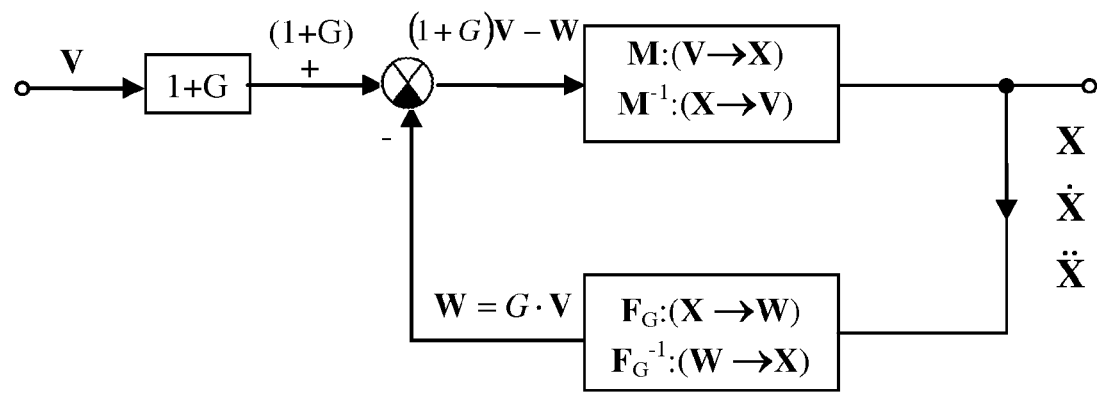
FIG. 4 is a schematic view of a M:(V→X) system with a negative identity feedback control model $F_G$:(X→W)

The derivation of Eq. (29) may be repeated for a negative identity feedback controller, shown in FIG. 4. The resulting $F_G$:(X→W) model constants will be identical to those given in Eq. (31).

Figure 5:
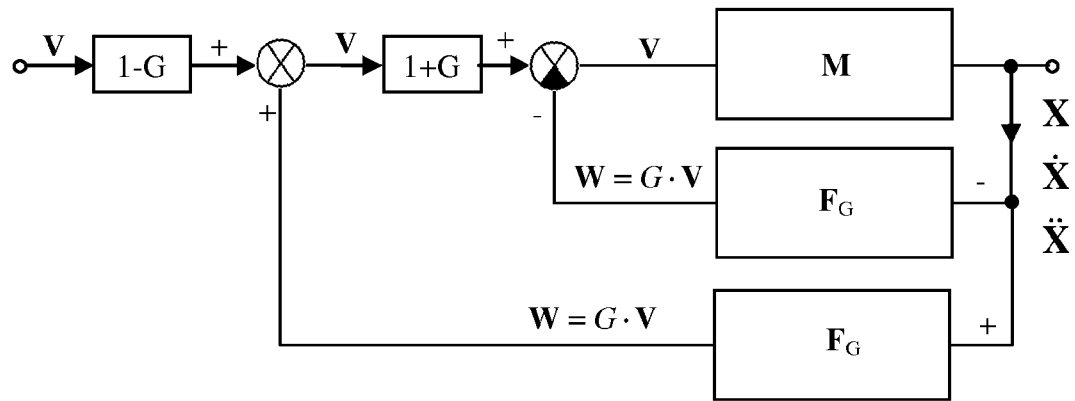
FIG. 5 is a schematic view of a cascaded positive and negative identity feedback controller in the feedback loop.

Model Application to Feedback Control 5.1 A General, Adaptive, Velocity and Position Feedback Controller An application example of the dynamic model position error correction can be given first for a general, adaptive, velocity and position feedback controller. The first task can be to apply a positive and a negative identity feedback controller to accept two feedback signals. These controllers can be cascaded, shown in FIG. 5. As shown, the $F_G$:(X→W) function can be the same for each controller, and so can be the velocity control signal V after each summator. Since the W correction signal can be the same in magnitude but used with opposite sign, an inverter can be applied in front of the negative identity feedback controller, while inverting the output as well. This will make the negative feedback controller completely equivalent with the positive feedback controller. Therefore, they can be merged and connected together into a single positive feedback summator. The simplified connection can be shown in FIG. 6, in which the positive feedback control signal can be separated from the negative and connected to the input reference position signal, $X^D$, and its derivatives.

By changing the positive feedback controller's input from X to $X^D$ and the negative feedback controller's input from X to $X^M$ accomplishes two goals simultaneously: (1) the motion of the machine under velocity control can be corrected by a negative feedback, and (2) an error signal input can be introduced as a difference between the measured and the desired reference model position, and motion properties, such as its time derivatives. The transfer of system constants to controller's constants can accomplish the controller adaptation to the reference model, which can be given by the operator-selected kinematics model of a perfectly tuned and massless machine.

Further explanation follows to illustrate the adaptation of the controller to a virtual, perfectly tuned and massless machine. The reference control input, V can be generated for the virtual machine, according to the operator selected kinematics model. An input signal of this kind may overtax the resources of a real machine, which has limited force and thus, limited link acceleration, and lacks perfect tuning. Accordingly, the machine's calibration constants may change with time, with uncontrolled external load, outside temperature, and other factors. Therefore, the real machine cannot follow the desired, reference motion, and errors develop in the position and its derivatives of the end effector.

In order to reduce errors between the desired and the real motion (i.e. position and its derivatives) of the end effector, the motion of each individual link can be corrected. This invention can provide for the correction of the motion of the individual links independently, each having it own actuator and in the link's own coordinate system, the motion may be considered one dimensional. The error correction can be explained via FIG. 6 as the a basic adaptive controller. Correction of the motion (i.e., position and its derivatives) of each individual link can be accomplished by generating a feedback signal, W and adding it to the reference control input, V. The feedback signal, W can be calculated from Eq. (30), the weighted sum of the errors in the motion properties, i.e., position and its derivatives at each sampled time instant during real time whereas the weights represent the dynamic model constants (A, B, C, and D in Eq. 14) multiplied by a feedback gain, G according to Eq. (31). The feedback gain, G, can be increased until the control input V+W reaches its saturation limit specific to the link's actuator or until the motion of the link remains acceptably smooth.

In a hypothetical case of no motion error, the V+W control signal passed to the link's actuator equals the reference control signal, V. The same signal can be used for model identification, which can be the best case, wherein the model of the link is unused.

In case of motion error, one part of the control signal (depending on the gain, G) passed to the actuator can be designated to the task of correcting current and past (accumulated) motion error, while the other part of the control signal carries new information from the operator to adjust the motion of the machine manually. Since the total range of the input signal to the link's actuator can be limited, saturation may occur due to either part, or the sum of the parts of the control signal. Saturation can, for example, be caused by: (a) the amount of necessary correction signal component, that is, the error in motion; (b) the amount of main gain, G and/or (c) the operator's ability to overtax the control system by requesting too high of a working velocity.

The weights in Eq. (30) can come from the machine's link model in Eq. (14), the model being identified during motion of the link under the control of the corrected control signal, V+W. If the motion is smooth and acceptable, the control signal at each sampled time instant can be determined based on the measured and identified dynamic behavior of the machine's link during the previous model identification time interval, e.g. 500 ms. Thus, a self-similarity solution can be recognized: the past model of the machine's link can be assumed to be valid for one more time step, e.g., 2.5 ms. Consequently, adaption of the real machine to an ideal no-error, no-dynamics machine can be accomplished by assuming a continuity in the self similarity of the dynamic model of the real machine.

5.2 A Four-Constant, Adaptive PID Controller

Figure 6:
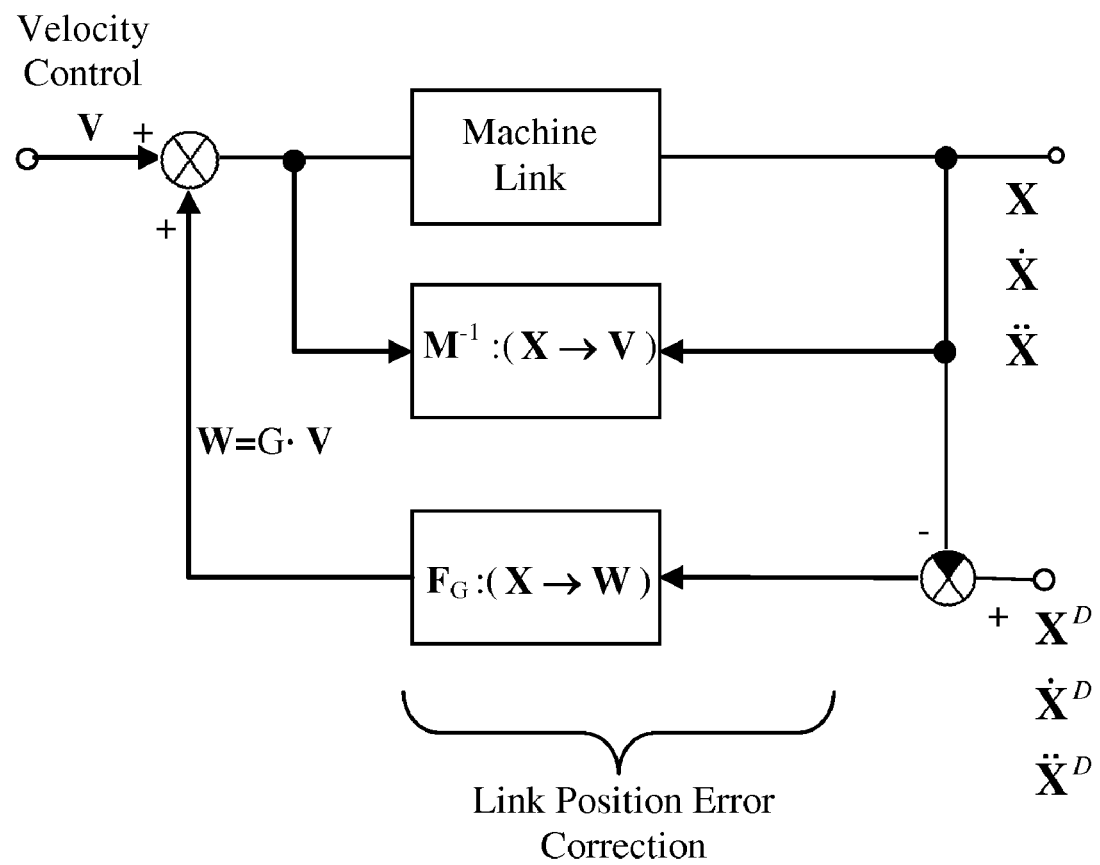
FIG. 6 is a schematic view of an adaptive controller with merged positive and negative identity controllers.

The second task can be to find constants for the $F_G$:(X→W) controller, residing in the Link Position Error Correction unit shown in FIG. 6. The PID controller's constants can be determined using the technique discussed with the positive and negative identity feedback controllers.

The conventional PID relationship in velocity control for an identity controller according to Eq. (30) is:

$$a \cdot \frac{d}{dt}(\dot{X}) + b \cdot (\dot{X}) + c \cdot \int (\dot{X})dt + d \cdot T = W \tag{32}$$

Note that all four constants can be applied in order to take advantage of the full system model, a generalization of the usual PID concept. In this case, the derivation given for the identity controller can be used without modification, and the controller constants will be given by Eq. (31). When the controller can be used in a differential schematic with position error cancellation, according to the application shown in FIG. 6, the feedback correction signal can be as follows:

$$W = \begin{bmatrix} \ddot{X}^M - \ddot{X}^D & \dot{X}^M - \dot{X}^D & X^M - X^D & 0 \end{bmatrix} \cdot \begin{bmatrix} a \\ b \\ c \\ d \end{bmatrix} \tag{33}$$

In Eq. (33), the constant d plays no role, however, its presence in the controller design in Eq. (31) affects the constants a, b, and c. Note that the gain, G in Eq. (31) allows for weighting the effects of velocity control, and position error compensation. The W feedback control signal can be given in a time-integrated form.

5.3 A Three-Constant, Adaptive PID Controller

In the case of intending to use only three parameters without the d constant, Eq. (32) simplifies and the PID feedback function can be written as a relationship between the $\ddot{X}$, $\dot{X}$ and X position properties and the W feedback vector:

$$\begin{bmatrix} \ddot{X} & \dot{X} & X \end{bmatrix} \cdot \begin{bmatrix} a \\ b \\ c \end{bmatrix} = W \tag{34}$$

Substituting Eq. (34) into Eq. (29) and expressing the PID constants, it gives:

$$\begin{bmatrix} a \\ b \\ c \end{bmatrix} = Pinv[\ddot{X} \quad \dot{X} \quad X] \left\{ (G-1)V + [\ddot{X} \quad \dot{X} \quad X \quad T] \begin{bmatrix} A \\ B \\ C \\ D \end{bmatrix} \right\} \quad (35)$$

Applying Eq. (35) to the measured properties, and using Eq. (14) to substitute for the A, B, C and D constants, Eq. (35) simplifies to:

$$\begin{bmatrix} a \\ b \\ c \end{bmatrix} = G \cdot Pinv[\ddot{X}^M \quad \dot{X}^M \quad X^M] \cdot V \quad (36)$$

Comparing Eq. (36) with Eq. (14) reveals that the a, b, and c constants correspond to a reduced, three-constant system in which the time-integral term can be missing. Since no advantage can be to be gained by reducing the number of system constants, the results for a, b, and c, according to Eq. (36) can be expected to be inferior to those from Eq. (31), when the controller can be used in a differential schematic.

5.4 A First-Order Feedback Correction Application.

A special application arises when the dynamic model can be used to determine the effects of short-term dynamic distortion. Such effects may be defined as the motion/position difference between the real machine and an identical machine but without mass, i.e., inertia forces.

The model for an identical, but massless machine can be first-order in nature, following the control signal, v, as an integrator. The concept of terminal velocity can be used to find the integrator's constant, using Eq. (8), for steady-state (when $\ddot{x}=0$ and $\dot{x}=0$):

$$\left. \begin{array}{l} \text{at } v = 0 \quad C\dot{x}_0 + D = 0 \\ \text{at } v = 1 \quad C\dot{x}_1 + D = 1 \end{array} \right\} \quad (37)$$

From Eq. (37), the terminal velocity change $\Delta \dot{x}_{M=0} = \dot{x}_1 - \dot{x}_0$ for a unit control input is, therefore:

$$\frac{d\dot{x}_{M=0}}{dv} = \frac{1}{C} \quad (38)$$

The solution to Eq. (38) can be the model for the massless machine link:

$$x_{M=0} = \frac{1}{C} \int_{t_0}^{t} v \, dt + x(t_0) \quad (39)$$

The similarity between Eqs. (39) and (24) can be seen if M can be simplified to a first-order model, by eliminating the second, matrix term in Eq. (25). The effect of the short-time dynamics on the link position can be best estimated as the difference between the measured and predicted values:

$$\Delta x_{dyn}(t) = x^M(t) - \frac{1}{C} \int_{t_0}^{t} v \, dt + x^M(t_0) \quad (40)$$

The elimination of the $\Delta x_{dyn}(t)$ from the position error signal may be advantageous in closed-loop control applications. The elimination of the effect of short-term dynamics reduces the load on the control system with limited resources. At the same time, the relatively low magnitude of dynamic error involved in typical hydraulic systems may make this solution acceptable in practical applications.

Application of the Adaptive Controller to a Hydraulic Machine Control

Figure 7:
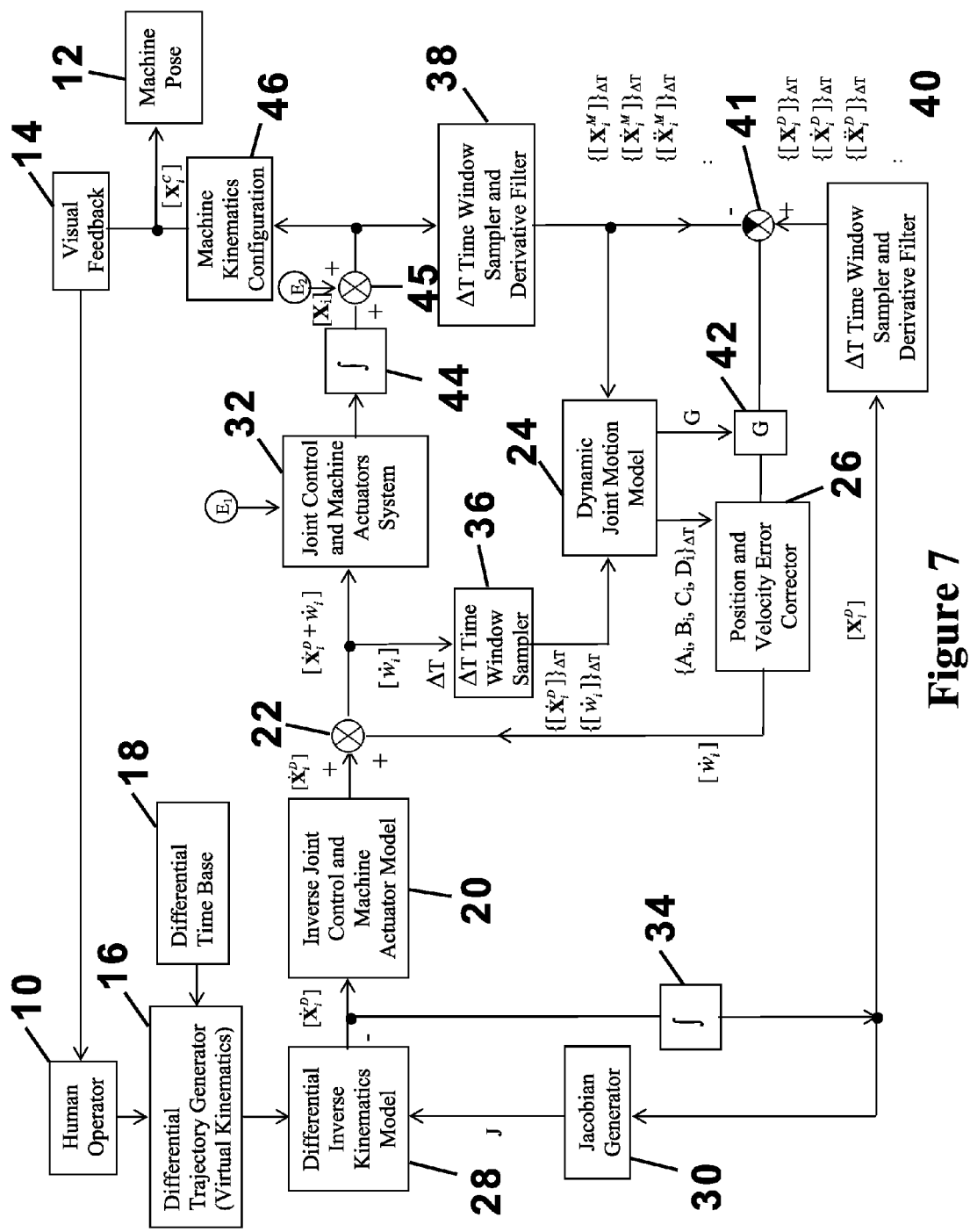
FIG. 7 is a schematic view of differential control architecture with dynamic machine model for position error cancellation according to an embodiment of the invention.

An application example is shown in FIG. 7, of a method wherein a human operator can control a real machine according to an imaginary, virtual kinematic configuration, suited for a given job, employing a differential control architecture.

FIG. 7 shows a control architecture suitable for a control system used with a hydraulically actuated machine such as a mechanical arm, for example a mechanical arm in the form of an excavator employing a shovel, a bucket or other suitable tool as an end effector. The mechanical arm can comprise a support and multiple links to support the end effector for movement relative to the support. The multiple joints can be revolute joints connecting the multiple links one to another, to the support and to the end effector. Each joint can be moved to different joint positions to effect relative movement of the members connected by the respective joint, and multiple controllable joint actuators can be provided to effect the joint movements. The multiple links can comprise a boom articulated to the support and a lever arm supporting the end effector.

Such a control-system-equipped excavator can be useful in construction, mining and other industries. The control architecture shown in FIG. 7 differs from that shown in Danko '100 with regard to the error correction methods employed, and in other respects. However, the FIG. 7 control architecture also has similarities to the control architecture shown and described in Danko '100, including the description referencing FIGS. 2-4 of Danko '100, as may understood from the respective descriptions. Accordingly, reference can be made to Danko '100 for more detail of the control architecture shown in FIG. 7, in these similar respects, as well as for more detail of machines with which the control architecture can be employed.

Employing the control architecture illustrated in FIG. 7, a human operator 10 uses an operator interface (not shown) to input, or select, a predetermined shovel trajectory family for processing by a trajectory generator 16 which receives timing signals from a differential time base 18. The operator interface can comprise a computerized video screen and associated input-output devices enabling human operator 10 to communicate with the control system as well as joysticks or other operator manipulated controls enabling the operator to control the machine's hydraulic actuators.

Desirably the operator interface enables human operator 10 to select a desired virtual machine kinematics transformation for the movement of the end effector and to generate a desired trajectory within the virtual kinematics of the end effector movement by means of the real-time input from joysticks or other suitable input devices. For example, human operator 10 can observe the machine pose 12 of the machine and provide visual feedback 14 from their observations of machine pose 12 to differential trajectory generator 16 to adjust the trajectory generated. If desired the control system can permit human operator 10 to supplement, modify or override the generated trajectory according to what the human operator 10 observes.

The differential control architecture shown comprises several modeling components including a joint control and machine actuators model 20, a dynamic joint motion model 24, and a differential inverse kinematics model 28. Error processing can be effected by a position and velocity error corrector 26. These elements of the control architecture will be further described below.

Trajectory generator 16 employs a differential time base 18 to generate a differential trajectory with transformation providing a virtual machine kinematics transformation, to differential inverse kinematics model 28.

The term "trajectory", as used herein, is intended to include a series of motion coordinates of an end effector, for example, a tool or a bucket or other suitable work implement, which coordinates represent a number of consecutive motion positions, or a locus of the motion, of the end effector within a time frame. The term "trajectory family" refers to a full range of motion along related or adjacent trajectory paths and includes an ability to move freely between trajectories in the family, for example from one trajectory to another and/or to move across trajectories. Also, as used herein, the term "machine kinematics" is intended to include a relationship between the positions or movements of the machine's joint actuators and the position or movement of the end effector.

If desired sensors (not shown), for example accelerometers can be provided to measure the actual positions of each link at discrete time steps as provided by differential time base 18. The sensors can provide an output signal vector comprising, for each time step, a measured position for each link and the time derivatives of the measured position, desirably up to at least the second derivative of the measured position.

Kinematics model 28 is built using Jacobian matrices received from a Jacobian generator 30 and generates desired reference velocities $[\dot{X}_i^D]$ to inverse joint control and machine actuator model 20. Inverse joint control and machine actuator model 20 translates the kinematics model 28 reference velocities $[\dot{X}_i^D]$, for example, motion velocities, into a vector of velocity signals $[X_i^D]$ for example, control voltages, for each joint to be moved that are appropriate for the particular machine to be controlled, producing control velocity signals. Note that for conventional operation, the machine actuator model 20 is a unit operator in the FIG. 7 control architecture, passing the signals unchanged.

The reference velocities $[X_i^D]$ from inverse joint control and machine actuator model 20 are combined by a signal summator 22 with an error signal for each link, or other desired mechanical component, received from position and velocity error corrector 26, to provide a negated error input signal vector $[\dot{w}_i]$. Note that in FIG. 7, the measured position and its derivatives are negated in the signal summator 41 while the reference values are also used with a negative sign according to a customary sign convention. The output of the signal summator 22 provides input to joint control and machine actuators system 32. The derivation of the error signal $[\dot{w}_i]$ will be described subsequently. The input signal vector provides, at discrete time steps, a reference velocity for each link according to the virtual machine kinematics transformation for the selected trajectory. Joint control and machine actuators system 32 can comprise processing components of a central computer as well as control units for each of the machine's joint actuators which can translate control signals into link movement.

A disturbance error $E_1$ is assumed to be present modifying the output of the joint control and machine actuators system 32 for factors such as external forces, and changes during motion in mass, inertia, and/or for representing hydraulic system errors. The output signal from joint control and machine actuators system 32 relates control input signal vector $[\dot{X}_i^D+\dot{w}_i]$ (typically voltage) to joint velocity vector $[\dot{X}_i]$ (typically motion velocity). Machine motion due to velocity is realized by integration, represented by integrator 44. Position measurement error $E_2$ is then applied by signal summator 45, which represents input to machine kinematics configuration 46. The machine adopts a machine pose 12 as determined by the input signal vector produced by signal summator 45.

The input signal vector $[\dot{X}_i^D+\dot{w}_i]$ which inputs to joint control and machine actuators system 32 is also sampled by time window sampler 36 to generate values for the input signal vector for each of a number of discrete sequential time steps. The time window can be a sliding time window provided in a suitable manner. For example, the time window can advance as real time operation proceeds to include one more recent, leading time step and to relinquish one older, trailing time step. The sliding time window can have any suitable duration, for example a duration in the range of from about 0.1 second to about 1 second, and can optionally be about 500 or 600 milliseconds. The sliding time window can comprise any suitable number of discrete time steps, for example from about 10 to about 1000 discrete time steps, optionally from about 50 to about 400 time steps. One embodiment of the invention can employ about 200 discrete time steps.

The time sample signal $[\dot{X}_i^D+\dot{w}_i]$ output from time window sampler 36 is supplied to dynamic joint motion model 24. Measured position and position derivative signals are also supplied to dynamic joint motion model 24 from the $\Delta T$ time window samples and derivative filter 38. Reference position and position derivative signals are supplied from the reference velocities output from kinematics model 28 by processing the signal in an integrator 34 to provide position information and inputting the position information signal to time window sampler and derivative filter 40. Time window sampler and derivative filter 40 samples the signal over the same sliding time window as time window sampler 36 and generates time derivatives of the reference position information. Any suitable number of time derivatives can be generated, using filter or other suitable methodology, for example up to the third or fourth order time derivates, if desired.

Desirably at least the second order time derivatives of the reference position signal are generated by the time window sampler and derivative filter 40 to enable dynamic model 24 to model and/or respond to dynamic characteristics of the machine such as link acceleration and the forces applied to the links and other components according to Newton's law of motion. Higher derivatives may represent higher vector components caused by a distributed system of inertia and elasticity.

The reference position and position derivatives signal output from time window sampler and derivative filter 40 is supplied to a signal comparator 41.

Measured position information obtained from signal summator 45 is processed by a time window sampler and derivative filter 38 which samples the measured position signal over the same sliding time window, and generates similar time derivatives of the measured position information to time window sampler and derivative filter 40. Thus, from second to fourth order time derivates of the measured position can be generated, if desired, and desirably at least the second order time derivatives of the measured position signal are generated by time window sampler and derivative filter 38

The time sample measured position and position derivative signals are supplied to dynamic joint motion model 24 and to signal comparator 41. Signal comparator 41 compares the time sample reference and measured position and position derivatives signals and outputs a difference signal to gain processor 42 and thence to position and velocity error corrector 26.

The joint positions are presented at the output of summator 45. The $\Delta T$ time window sampler and derivative filter 38 generates the position measurement values and the derivatives.

Usefully, the machine link positions can be described with reference to a linear displacement, optionally, linear displacement of an actuator component, for example the piston rod of a hydraulic piston-and-cylinder actuator. This approach can be advantageous as compared with use of angular displacements and may reduce the potential inertia to mass of the linear movement of the hydraulic cylinder rods. During the short sliding time window, the inertial forces that will result from potential movements of the actuators can be identified as forces from linear movement of masses such as the piston rods.

Dynamic joint motion model 24 processes the two signals input to it to generate time variable machine coefficients [$A_i$, $B_i$, $C_i$, $D_i$] which are supplied to position and velocity error corrector 26. Dynamic joint motion model 24 also calculates a suitable gain according to the relative strengths of the signals received by dynamic joint motion model 24 which is supplied to gain processor 42 to amplify or otherwise modify the difference signal from signal comparator 41.

Position and velocity error corrector 26 processes the time variable machine coefficients [$A_i$, $B_i$, $C_i$, $D_i$] received from dynamic joint motion model 24 for a time window $\Delta T$ and the gain processed difference signal from signal comparator 41 and outputs position and velocity error correction signal [$w_i$] to signal summator 22 thereby providing a closed negative feedback control loop to diminish or eliminate the error signal for each respective machine link. The closed negative feedback control loop employs the time variable machine coefficients from dynamic joint motion model 24 and can accordingly function as an adaptive feedback controller which varies the error signal according to the changing condition of the machine.

Adaptive PID Controller Tests with Numerical Simulation

Illustrative examples of the model and controller components can be given based on numerical simulation. The movement of a small excavator was first modeled, following a desired bucket pin movement along the edges of a square. This motion example will later be shown in Point 7 for the real machine. The numerical simulation used $\Delta t=0.001$ s sampling time t and 4500 steps along each side of the square. The machine's boom and arm movement can be modeled with a $4^{th}$ order transfer function in SIMULINK by MATLAB (2004), representing link masses, elasticity and other factors affecting motion starting from the control voltage at the electro-hydraulic valves. The link transfer function was applied between valve control signal and linear hydraulic cylinder velocity. Simulation of the revolute machine kinematics was made using standard coordinate configuration and transformation techniques from robotics (Danko et al., 2007). The observed output for machine link dynamic model identification were link angular positions, calculated from the linear hydraulic actuator's positions. The linear actuator to revolute angle transformation naturally imposed a distortion on the dynamic transfer function between control signal and angular position, appearing as a deviation, and making the identified model different in model constants from those used as machine input parameters. The desired trajectory along the straight-lines of the square required the transformation of the machine kinematics, using a differential control architecture for the task (Danko, 2001), shown in FIG. 7. The angular positions were recorded during simulation for the dynamic model identification tests.

A small amplitude, sinusoidal signal was added to the motion control signals for providing non-zero input and output even at the initial point at rest. The sliding-window modeling time frame was $\Delta T=600$ ms comprising of 600 time steps.

Figure 8:
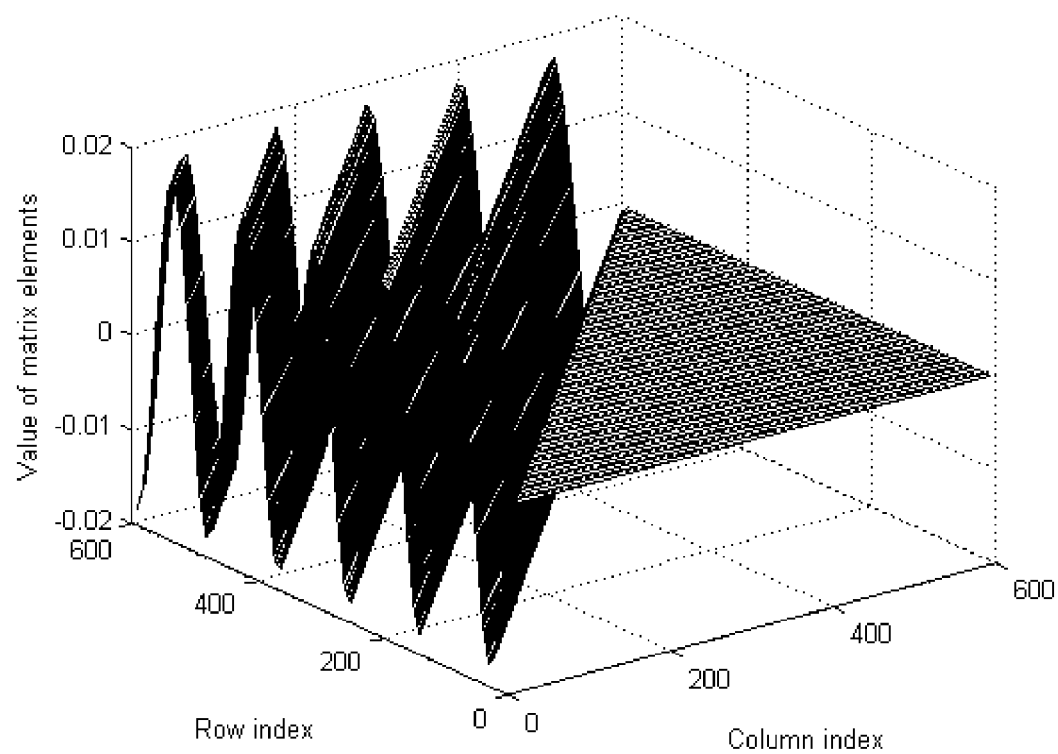
FIG. 8 is a graphic view of an R-Causal model matrix Q-1 in (Eq. 22 below) at frame position 2500.
Figure 9:
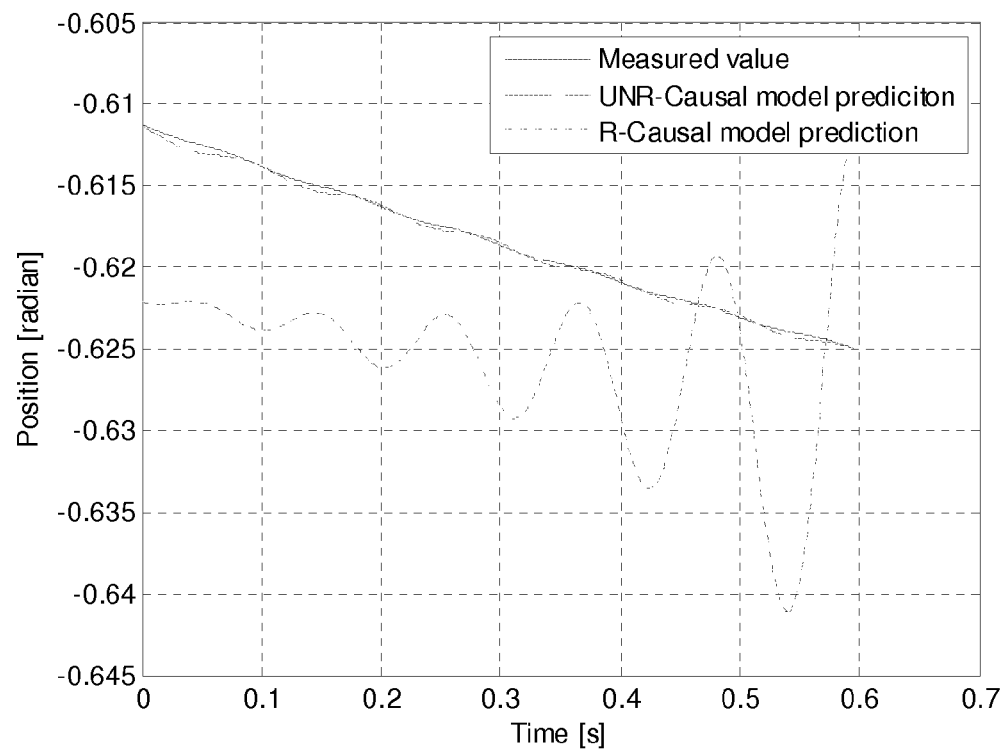
FIG. 9 is a graphic view of position prediction with R-Causal (Eq. 22) and UnR-Causal (Eq. 28) models at frame position 2500.
Figure 10:
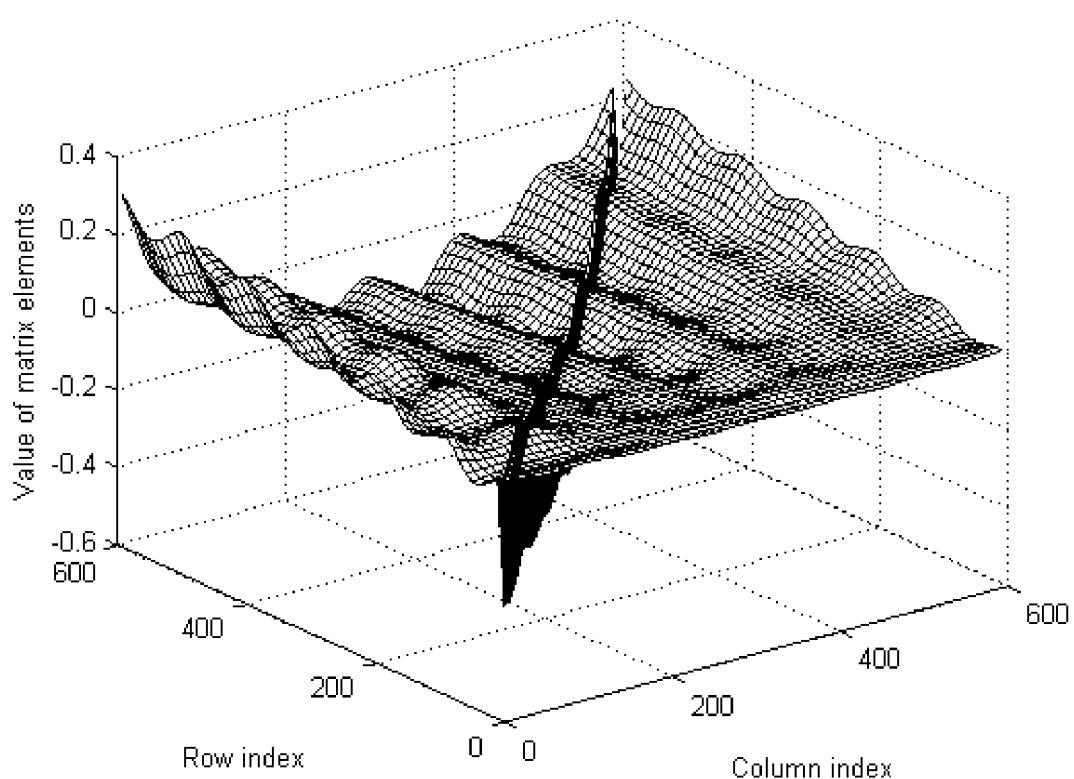
FIG. 10 is a graphic view of a UnR-Causal model matrix in Eq. (28).

FIG. 8 shows the $Q^{-1}$ inverse matrix in Eq. (22) as the relativistic, causal (R-Causal) link model for the boom at the middle of the first side of the square at position 2500. The upper-triangle elements of the matrix can be zero as expected. Position prediction with this matrix can be depicted in FIG. 9, showing significant numerical error and a tendency to stability problem. The M matrix in the UnR-Causal model matrix can be shown in FIG. 10 at the same position. The upper triangular elements can be nonzero and the model can be indeed unrelativistic. However, the matrix with dominant, near-diagonal elements supports a stable model, and an excellent prediction, shown in FIG. 9.

The four-constant, adaptive PID controller was also tested against the simulated results. To show correction, an error was added to the electro-hydraulic valve characteristics in the form of a small shift in constant $c_3$, shown in FIG. 1. While the Joint Control and Machine Actuator System was defined with the error as part of $E_1$, the valve model in the Inverse Joint Control and Machine Actuator Model was kept unchanged. The simulation in the open-loop control shows divergence between the actual and the designed link positions, shown in FIG. 11 for the arm for 5000 steps.

The PID controller constants were automatically identified and the control signal $\dot{w}=dw/dt$ applied for error compensation. The effect of this compensation was first simulated using the UnR-causal machine model for two reasons: (1) to check the model's performance, and (2) to verify the PID controller.

Figure 11:
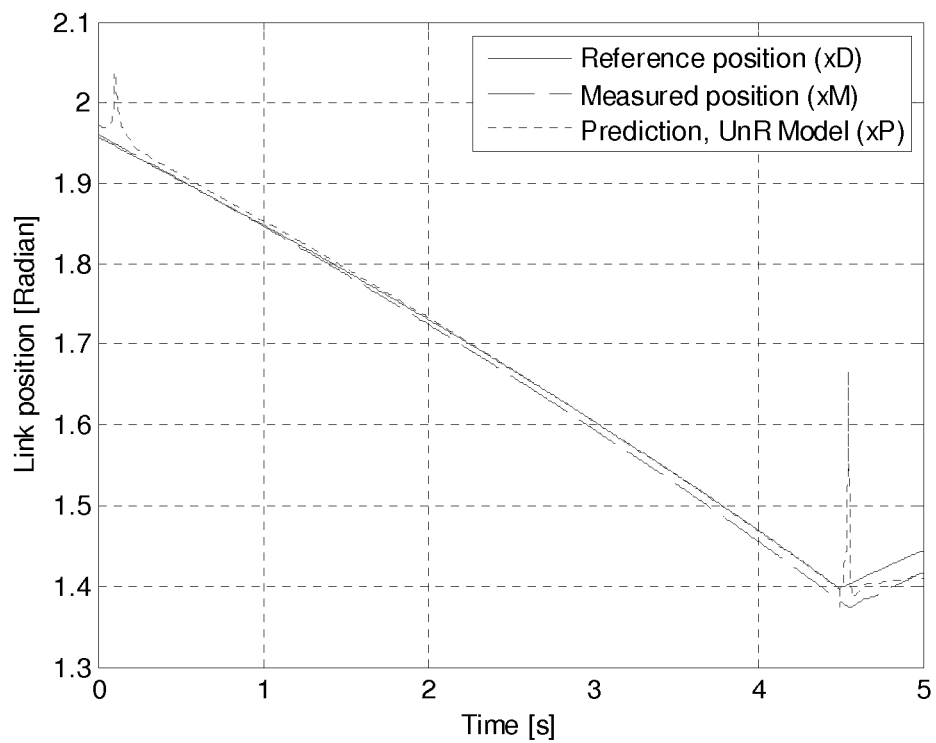
FIG. 11 is a graphic view of reference ($X^D$) and actual ($X^M$) positions for the arm link along the first side of a square with value error wherein a UnR model prediction ($X^P$) position shows the simulation of a PID controller with G=0.2.
Figure 12:
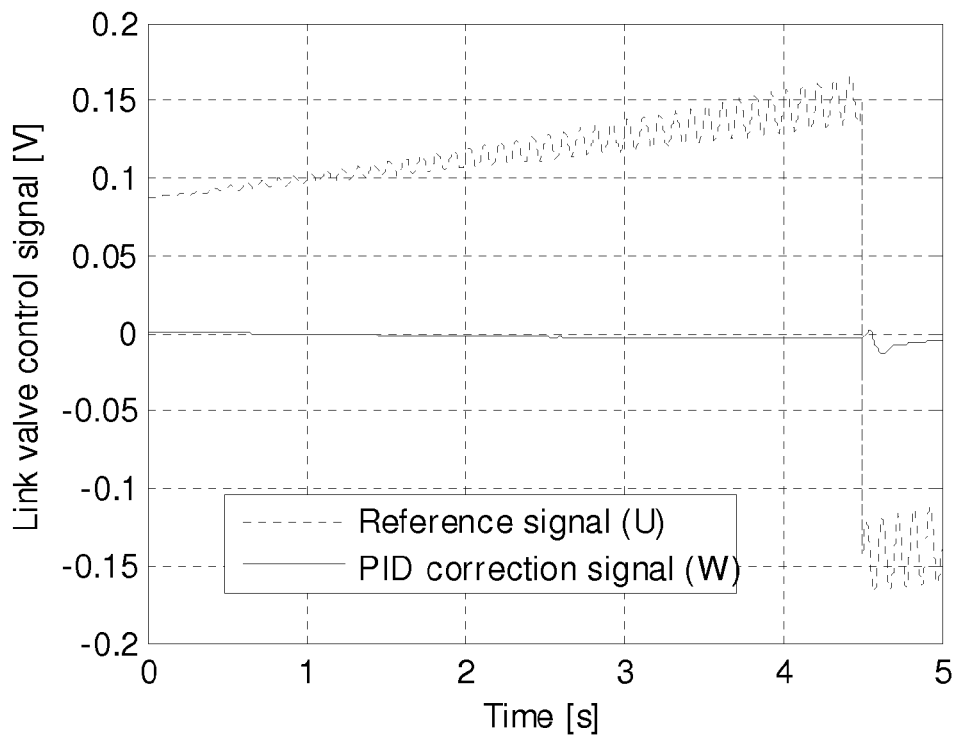
FIG. 12 is a graphic view of a value control signal and PID correction signal for the arm.
Figure 13:
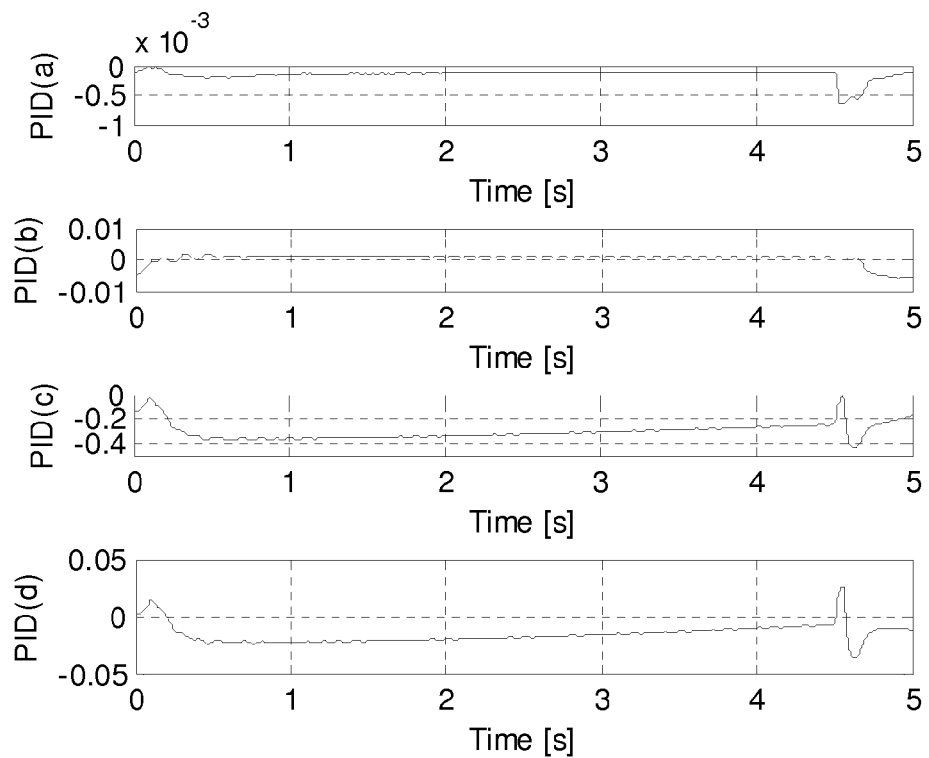
FIG. 13 is a graphic view of PID constants identified from the machine model during motion.

The UnR-causal model prediction can be shown in FIG. 11, a well-behaving function with time except for the corners, where the 0.6 s-wide moving model window causes dynamic response errors. The valve control signal for the arm can be shown in FIG. 12, obtained for G=0.2. The control signal shows the small-amplitude, deliberate sinusoidal perturbation. The PID correction signal can be smooth. The PID constants used in Eq. (33) and obtained from Eqs. (14) and (31) can be depicted in FIG. 13. The dominant constant can be c, referring to velocity, the one subjected to a deliberate error. Consequently, the model-based controller can be capable of automatic actuator error identification and correction.

The correction signal was applied to the UnR-Causal model prediction, showing the integrating effect; the $X^P$ output closely follows the reference, instead of the measured trajectory, which was used for its identification.

Dynamic Model Application to Machine Control

Computer-assisted operator control of hydraulic machinery desirably requires stable, smooth machine response. The differential, forward-prediction kinematics solution for adjusting the as-built machine hardware kinematics to an as-desired kinematics (Danko, 2001) provides desirable, reference actuator velocities and resultant motion trajectory, best suitable for a task. However, the execution of the reference velocities and trajectory may require closed-loop position error compensation. The embedded, dynamic model can be applied to this task in a new way, relative to the solution disclosed in 100.

A simple, new, dynamic machine model can be provided for real-time control applications for a hydraulic manipulator. The model can be linearized by replacing variables with sliding-averaged constants.

A least-square-fit method can be given for dynamic model constants evaluation. The dynamic machine model can be embedded in a differential control architecture in which the motion kinematics of the machine can be software-controlled. The control method retains the advantages of the differential kinematics transformation with which continuous operator control can be provided by means of controlling transformed actuator velocities. The closed-loop position control provides for the correction of motion error caused by machine inertia, control system-component imperfectness, repeatability, and other errors.

A new solution can be given using the principles of unit controllers for the simultaneous differential control of machine link velocity and desired actuator positions.

A new, adaptive controller can be given in which the controller constants can be directly substituted by the parameters from the dynamic model identification, while the reference model can be according to the desired kinematics. A UnRcausal model can be developed for position prediction in the vicinity of a measured motion trajectory used for model parameter identification.

In embodiments of the present invention, the predictive model can be not needed for the design and application of a closed-loop feedback controller.

The dynamic machine model can be continuously updated during motion, providing for adjustments to model errors caused by approximations, including the replacement of the true cross-effects between machine links with time dependent adjustments, time-averaging of the model coefficients, the treatment of non-linearity, and the solution technique.

The described model identification technique does not require pre-assumptions about noise statistics. In spite of calculating time derivatives by third-order derivative filters algorithms, the control system can be not noise sensitive, and no additional signal filtering can be needed. Experiments with applying high-order Chebyshev filters to the measured signals showed no improvement in performance.

The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art. Should there appear to be conflict between the meaning of a term as used in the written description of the invention in this specification and the usage in material incorporated by reference from another document, the meaning as used herein is intended to prevail.

While illustrative embodiments of the invention have been described above, it is, of course, understood that many and various modifications will be apparent to those of ordinary skill in the relevant art, or may become apparent as the art develops, in the light of the foregoing description. Such modifications can be contemplated as being within the spirit and scope of the invention or inventions disclosed in this specification.

The invention claimed is:

1. A control method for controlling a hydraulically actuated mechanical arm to perform a task, the mechanical arm optionally being a hydraulically actuated excavator arm and comprising a support, multiple links, an end effector, the end effector being a work implement supported by the links for movement relative to the support, multiple joints connecting the multiple links one to another, to the support and to the end effector, each joint being movable to different joint positions to effect relative movement of the members connected by the respective joint, and multiple controllable actuators to effect the joint movements wherein the method employs a control system comprising a number of selectable virtual machine kinematics configurations providing end effector trajectory families for performing different tasks, an operator interface comprising operator input devices, optionally joysticks, the operator interface enabling an operator to select a desired virtual machine kinematics transformation for the movement of the end effector and to define a desired trajectory within the virtual kinematics of the end effector movement, and wherein the method comprises:

the operator selecting a suitable kinematics transformation to perform a desired task; and the operator providing control signals relative to the transformed virtual machine in real time employing the operator interface input devices to define a desired trajectory;

the control system controlling the actuators to move the end effector along the desired trajectory by:

generating a control signal for each joint actuator, each control signal comprising an input signal vector providing, at discrete time steps, a reference position for each link according to the virtual differential kinematics configuration for the desired trajectory, the input signal vector also providing the time derivatives of the reference position up to at least the second derivative of the reference position;

measuring the actual positions of each link for the respective time steps and providing an output signal vector from the measured actual positions, the output signal vector comprising, for each time step, a measured position for each link and the time derivatives of the measured position up to at least the second derivative of the measured position;

determining a dynamic model of the motion of the hydraulic arm for each link by relating the input signal vector for each respective link to the output signal vector for the same link, wherein the dynamic model comprises constant coefficients;

determining an error signal for each link as the weighted sum of the differences between the measured position and the reference position and between the time derivatives of the measured position and the time derivatives of the reference position for each respective link wherein the weights used in the determination of the error signal are being determined from the constant coefficients of the dynamic model; and applying the error signal in a closed negative feedback control loop to diminish or eliminate the error signal for each respective link.

2. A control method according to claim 1 comprising determining a dynamic model of each link by identifying constant coefficients of a differential equation of at least second order relating the sampled signal values of the position and the position time-derivatives to the sampled signal values of the control input signal by comparing the sampled values of the input signal vector with the sampled values of the output signal vector over a sliding time window comprising a number of the discrete time steps.

3. A control method according to claim 2, wherein the identifying of the constant coefficients of the differential equation comprises a least-square fit for achieving a best comparison for a selected number of samples.

4. A control method according to claim 2 comprising determining said weights in the weighted sum from the coefficients of the dynamic motion model obtained for a previous sliding time window, optionally the immediately preceding sliding time window.

5. A control method according to claim 4, wherein the said weights are calculated from the said coefficients by a multiplier of less than unity.

6. A control method according to claim 2 wherein the sliding time window has a duration in the range of from about 0.1 second to about 1 second, optionally about 500 milliseconds and wherein the sliding time window comprises from about 50 to about 500 of the discrete time steps, optionally about 200 discrete time steps.

7. A control method according to claim 2 wherein the control system comprises a motion control unit for each actuator, the method comprising supplying each input signal vector as a positive input to a summator for the motion control unit of the respective actuator for each link to generate the desired motion.

8. A control method according to claim 7 comprising continuously subtracting the error signal from the positive input to each link summator to diminish the determined motion error.

9. A control method according to claim 1 wherein each link position is described with reference to a linear displacement, optionally, linear displacement of an actuator component.

10. A method of operating an excavator comprising a hydraulically actuated mechanical arm wherein the operating method comprises controlling the hydraulically actuated mechanical arm by a control method according to claim 1.

11. An excavator comprising a control system according to claim 1.

12. A control system for controlling a hydraulically actuated mechanical arm to perform a task, the mechanical arm optionally being a hydraulically actuated excavator arm and comprising a support, multiple links, an end effector, the end effector being a work implement supported by the links for movement relative to the support, multiple joints connecting the multiple links one to another, to the support and to the end effector, each joint being movable to different joint positions to effect relative movement of the members connected by the respective joint, multiple controllable actuators to effect the joint movements and a control system, wherein the control system is configured to control the actuators to move the end effector along the desired trajectory and comprises:
- a number of selectable virtual machine kinematics configurations providing end effector trajectories for performing different tasks;
- an operator interface comprising operator input devices, optionally joysticks, the operator interface enabling an operator to select a desired virtual machine kinematics transformation for the movement of the end effector and to define a desired trajectory family within the virtual kinematics of the end effector movement;
- a joint control and machine actuators system configured to generate a control signal for each joint actuator, each control signal comprising an input signal vector providing, at discrete time steps, a reference position for each link according to the virtual differential kinematics configuration for the desired trajectory, the input signal vector also providing the time derivatives of the reference position up to at least the second derivative of the reference position;
- a dynamic joint model module configured to determine a motion model of the hydraulic arm for each link by relating the input signal vector for each respective link to the output signal vector for the same link; and
- a position and velocity error corrector configured to determine an error signal for each link as the weighted sum of the differences between the measured position and the reference position and between the time derivatives of the measured position and the time derivatives of the reference position for each respective link;

wherein the control system is configured to apply the error signal in a closed negative feedback control loop to diminish or eliminate the error signal for each respective link.

13. A control system according to claim 12 wherein the dynamic joint model module is configured to identify, over a sliding time window, constant coefficients of a differential motion equation by comparing the sampled values of the input signal vector with the sampled values of the output signal vector of said sampled values taken at a number of the discrete time steps.

14. A control system according to claim 13 wherein the sliding time window has a duration in the range of from about 0.1 second to about 1 second, optionally about 500 milliseconds and wherein the sliding time window comprises from about 50 to about 500 of the discrete time steps, optionally about 200 discrete time steps.

15. A control system according to claim 13 wherein the control system comprises a motion control unit for each actuator and the control system is configured to supply each input signal vector as a positive input to a summator for the motion control unit of the respective actuator for each link to generate the desired motion.

16. A control system according to claim 15 comprising wherein the control system is configured to continuously subtract the error signal from the positive input to each link summator to diminish the determined motion error.

17. A control system according to claim 12 wherein the dynamic joint model module is configured to determine said weights used in the weighted sum from the coefficients of the dynamic motion model obtained for a previous sliding time window, optionally the immediately preceding sliding time window.

18. A control system according to claim 17 wherein the dynamic joint model module is configured to determine the said weights from the coefficients of the dynamic motion model by a multiplier of less than unity.

19. A control system according to claim 12 configured for each link position to be described with reference to a linear displacement, optionally, a linear displacement of an actuator component.

* * * * *